United States Patent
Park

(10) Patent No.: US 10,650,491 B2
(45) Date of Patent: May 12, 2020

(54) IMAGE UP-SCALE DEVICE AND METHOD

(71) Applicant: LG DISPLAY CO., LTD., Seoul (KR)

(72) Inventor: Yong Min Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/887,541

(22) Filed: Oct. 20, 2015

(65) Prior Publication Data

US 2016/0117799 A1 Apr. 28, 2016

(30) Foreign Application Priority Data

Oct. 23, 2014 (KR) ........................ 10-2014-0144504

(51) Int. Cl.
| | |
|---|---|
| *G09G 5/02* | (2006.01) |
| *G06K 9/52* | (2006.01) |
| *G06T 3/40* | (2006.01) |
| *G06T 7/90* | (2017.01) |
| *G09G 5/391* | (2006.01) |
| *G06T 7/73* | (2017.01) |

(Continued)

(52) U.S. Cl.
CPC .............. *G06T 3/40* (2013.01); *G06K 9/4652* (2013.01); *G06K 9/4661* (2013.01); *G06K 9/52* (2013.01); *G06K 9/6215* (2013.01); *G06T 7/73* (2017.01); *G06T 7/90* (2017.01); *G09G 5/026* (2013.01); *G09G 5/391* (2013.01); *G09G 2300/0452* (2013.01); *G09G 2340/0407* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 2004/0239813 A1* | 12/2004 | Klompenhouwer | ... G09G 5/006 348/638 |
| 2007/0279372 A1 | 12/2007 | Brown Elliott et al. | |
| 2008/0036792 A1 | 2/2008 | Liang et al. | |

(Continued)

FOREIGN PATENT DOCUMENTS

| | | |
|---|---|---|
| CN | 101501725 A | 8/2009 |
| KR | 10-2013-0030598 A | 3/2013 |
| KR | 10-2013-0060476 A | 6/2013 |

OTHER PUBLICATIONS

Communication dated Feb. 26, 2016 from the European Patent Office in counterpart European application No. 15191221.9.

(Continued)

*Primary Examiner* — Jiangeng Sun
(74) *Attorney, Agent, or Firm* — Morgan, Lewis & Bockius LLP

(57) ABSTRACT

An image scale device for up-scaling an input image by generating data signals for a plurality of additional pixels, the additional pixels added to the input image to generate an up-scaled image, the device comprising an RGB interpolator configured to generate red (R), green (G), and blue (B) data signals for each of the additional pixels on the basis of the R, G, and B data signals of an arbitrary pixel among pixels of the input image that are adjacent to the respective additional pixel, and a W interpolator configured to generate a white (W) data signal for each of the additional pixels on the basis of W data signals of the pixels of the input image that are adjacent to the respective additional pixel.

12 Claims, 5 Drawing Sheets

(51) Int. Cl.
*G06K 9/46* (2006.01)
*G06K 9/62* (2006.01)

(56) References Cited

U.S. PATENT DOCUMENTS

| | | | |
|---|---|---|---|
| 2008/0079755 A1* | 4/2008 | Shiomi | G09G 3/2003 345/690 |
| 2009/0174638 A1* | 7/2009 | Brown Elliott | G02F 1/133621 345/88 |
| 2010/0177246 A1* | 7/2010 | Yong | H04N 5/335 348/580 |
| 2010/0259556 A1 | 10/2010 | Inuzuka | |
| 2011/0037784 A1 | 2/2011 | Shiomi | |
| 2012/0287143 A1* | 11/2012 | Brown Elliott | G09G 5/02 345/589 |

OTHER PUBLICATIONS

Notification of the First Office Action dated Sep. 5, 2017 from The State Intellectual Property Office of People's Republic of China in related Chinese application No. 201510691052.2.

* cited by examiner

| | EVALUATION GROUP A (SNR,dB) | EVALUATION GROUP B (SNR,dB) |
|---|---|---|
| #1 | 36.19 | 39.24 |
| #2 | 36.21 | 37.95 |
| #3 | 22.42 | 22.46 |
| #4 | 29.65 | 30.29 |
| #5 | 28.64 | 28.40 |
| #6 | 29.97 | 29.71 |

IMAGE UP-SCALE DEVICE AND METHOD

The present application claims priority to Korean Patent Application No. 10-2014-0144504, filed on Oct. 23, 2014, which is hereby incorporated by reference in its entirety.

BACKGROUND

Field of the Disclosure

The present application relates to an image up-scale device and method of up-scaling an image.

Background

Display devices may display various types of image data. Image data may, for example, be captured by a still photo or a digital video camera, obtained from a still photo archive, generated through a software application, received through a broadcast or streaming medium, etc. The display devices may be integrated with a variety of electrical appliances. For example, the display devices may be integrated with desktop computers, laptop computers, computer workstations, personal digital assistants, mobile device (e.g., mobile phones), wireless communication devices, multimedia devices, cameras, and exclusive viewing stations such as television receivers. Such display devices include liquid crystal display (LCD) devices, cathode ray tube (CRT) display devices, plasma display devices, projection display devices, organic light emitting diode display devices, and so on.

In general, a display device may have a native maximum resolution. The number of pixels of an image being displayed on the display device may be limited to the native maximum resolution. The display device may receive an image with this native maximum definition or less. As such, image data or information having a smaller number of pixel data signals than the total number of pixels of the display may be provided. In this case, the display device may "up-scale" the low resolution image data into higher resolution image data. To this end, the display device may generate additional pixels by performing interpolation for the lower resolution image data.

Image up-scaling becomes more important as display devices become larger. Interpolation methods such as bi-linear interpolation, bi-cubic interpolation, cubic spline interpolation, Lanczos interpolation, and edge-directed interpolation (EDI) are being applied for image up-scaling. Such interpolation methods generate additional pixel data signals using data signals of pixels adjacent to one another. Due to this, such interpolation methods may require a large number of line memories. For example, each of the bi-cubic interpolation and the Lanczos interpolation may be performed on sixteen pixel data signals of pixels adjacent to one another in order to create an additional pixel data signal. In this case, each of the bi-cubic interpolation and the Lanczos interpolation may need to be repeatedly performed a total of five times. In such a case, at least four line memories must be used for each of the bi-cubic interpolation and the Lanczos interpolation. Moreover, a sync function may need to be used to determine weight values of the adjacent pixels. This sync function may typically be defined by third degree polynomials. Due to this, the computations for the sync function may largely increase.

SUMMARY

Accordingly, embodiments of the present application are directed to an image scale unit and method that may substantially obviate one or more problems due to the limitations and disadvantages of related art.

The embodiments relate to providing an image up-scale device and method which are adapted to reduce a computational quantity and the size of a logic circuit for up-scaling an input image.

Also, the embodiments relate to providing an image up-scale device and method which are adapted to reduce a computation quantity for an image up-scale by dividing RGBW data signals into a color difference component and a brightness component, and differently interpolating the color difference component and the brightness component.

To achieve these and other advantages and in accordance with the purpose of embodiments of the invention, as embodied and broadly described herein, in one aspect of the invention, an image scale device includes an image scale device for up-scaling an input image by generating data signals for a plurality of additional pixels, the additional pixels added to the input image to generate an up-scaled image, the device comprising an RGB interpolator configured to generate red (R), green (G), and blue (B) data signals for each of the additional pixels on the basis of the R, G, and B data signals of an arbitrary pixel among pixels of the input image that are adjacent to the respective additional pixel, and a W interpolator configured to generate a white (W) data signal for each of the additional pixels on the basis of W data signals of the pixels of the input image that are adjacent to the respective additional pixel.

In another aspect of the invention, a method of up-scaling an input image by adding a plurality of additional pixels to generate an up-scaled image, the method comprising generating a color difference component for each of the additional pixels on the basis of the color difference component of an arbitrary pixel among pixels of the input image that are adjacent to the respective additional pixel, and generating a brightness component for each of the additional pixels on the basis of the brightness component of the pixels of the input image that are adjacent to the respective additional pixel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiments of the present disclosure and together with the description serve to explain the disclosure. In the drawings.

DETAILED DESCRIPTION OF THE EMBODIMENTS

Figure 1:
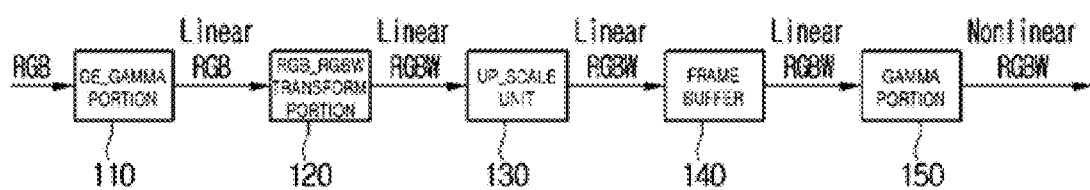
FIG. 1 is a block diagram showing a graphic apparatus which includes an image scale device according to an embodiment of the present disclosure.

Reference will now be made in detail to an image up-scale device of a display device (for example, an OLED display device) in accordance with embodiments of the present disclosure, examples of which are illustrated in the accompanying drawings. These embodiments introduced hereinafter are provided as examples to convey their spirit to an ordinary skilled person in the art. Therefore, these embodiments might be embodied in a different shape, so are not limited to these embodiments described here. In the drawings, the size, thickness and so on of a device may be exaggerated for convenience of explanation. Where possible, the same or similar reference numbers may be used throughout this disclosure, including the drawings, to refer to the same or similar parts.

FIG. 1 is a block diagram showing a graphic apparatus which includes an image up-scale device according to an embodiment of the present disclosure. The graphic apparatus 100 shown in FIG. 1 may be manufactured as an independent body, or built into a larger system. For example, the graphic apparatus 100 may be included in a wireless communication device (such as a mobile wireless phone), a digital camera, a video camera, a digital multimedia player, a personal digital assistant (PDA), a video game console, a different type video device, or an exclusive viewing station (such as a television receiver). As another example, the graphic apparatus 100 may be included in a personal computer (such as an ultra-mobile personal computer), or a laptop device. As still another example, the graphic apparatus 100 may be included in at least one integrated circuit and chip which may be applied to a part or all of the above-mentioned devices.

The graphic apparatus 100 may perform a variety of applications, such as graphic applications, video applications, audio applications, and different types of multimedia applications. For example, the graphic apparatus 100 may be used to perform graphic applications, video game applications, video playback applications, digital camera applications, instant messaging applications, video teleconferencing applications, mobile applications, or video streaming applications.

Moreover, the graphic apparatus 100 may process a variety of data types and formats. For example, the graphic apparatus 100 may process image data being input to a display device, which will be described in further detail below.

With reference to FIG. 1, the graphic apparatus 100 may include a de-gamma portion 110, a RGB-RGBW transform portion 120, an up-scale device 130, a frame buffer 140, and a gamma portion 150.

The de-gamma portion 110 may input RGB data signals of image data and perform a de-gamma treatment for the input RGB data signals in a frame unit. Also, the de-gamma portion 110 may perform a bit-stretch treatment for the de-gamma-treated RGB data signals. For example, the de-gamma portion 110 may compensate for an inverse gamma, which is included in the input RGB data signals, through the de-gamma treatment. As such, the (de-gamma-treated) RGB signals may have a linear property. Also, the de-gamma portion 110 may increase the de-gamma-treated RGB data signals in the number of bits through the bit stretch treatment. In accordance therewith, the generation of bit overflow phenomena at data operations, which are performed for converting the RGB data signals into the RGBW data signals, may be prevented. Such a de-gamma portion 110 may simultaneously perform the de-gamma treatment and the bit stretch treatment using a de-gamma LUT (look-up-table).

The RGB-RGBW transformation portion 130 may convert the RGB data signals, which are applied from the de-gamma portion 110, into RGBW data signals. The RGBW data signals obtained by the RGB-RGBW transformation portion 130 may be used to drive a display panel including RGBW sub-pixels. To optimize power consumption without changing color coordinates, the RGB-RGBW transformation portion 130 may add a white (W) data signal using RGB data components, which are based on measured or estimated values having the same brightness and color coordinate as a W data component, and perform subtractions of the RGB data components from the (de-gamma-treated) RGB data signals. For example, the RGB-RGBW transformation portion 130 may generate the W data signal by extracting one of a common gray scale value, which is represented by equation 1, and a minimum gray scale value, which is represented by Equation 2, from the (de-gamma-treated) RGB data signal. Also, the RGB-RGBW transformation portion 130 may generate secondary RGB data signals by subtracting the W data signal from each of the (de-gamma-treated) RGB data signals.

$$W=\text{Com}(R,G,B) \qquad \text{[Equation 1]}$$

$$W=\text{Min}(R,G,B) \qquad \text{[Equation 2]}$$

In another manner, the RGB-RGBW transformation portion 130 may convert R, G, and B data signals into four color data signals, which include R, G, B, and W data signals, using data conversion methods based on properties of each sub-pixel, such as a brightness property of the sub-pixel and a driving property of the sub-pixel. In this case, the RGB-RGBW transformation portion 130 may convert the RGB data signals into the RGBW data signals using data conversion methods such as, for example, those disclosed in Korean patent publication nos. 10-2013-0060476 and 10-2013-0030598.

The up-scale device 130 may generate color components of an additional pixel on the basis of color components of an arbitrary pixel on the input image, and derive a brightness component of the additional pixel using the brightness component of the arbitrary pixel on the input image. In accordance therewith, the up-scale device 130 may generate up-scaled image data. Also, when the image data is up-scaled, the up-scale device 130 may perform interpolation for the RGBW data signals. Such an up-scale device 130 will be described below in more detail.

The gamma portion 150 receives the up-scaled RGBW data signals RGBW from the up-scale portion 130 through the frame buffer 140. Also, the gamma portion 150 may perform a gamma treatment for the input RGBW data signals RGBW in a frame unit. As such, the gamma-treated RGBW data signals may each have a non-linear property.

Figure 2:
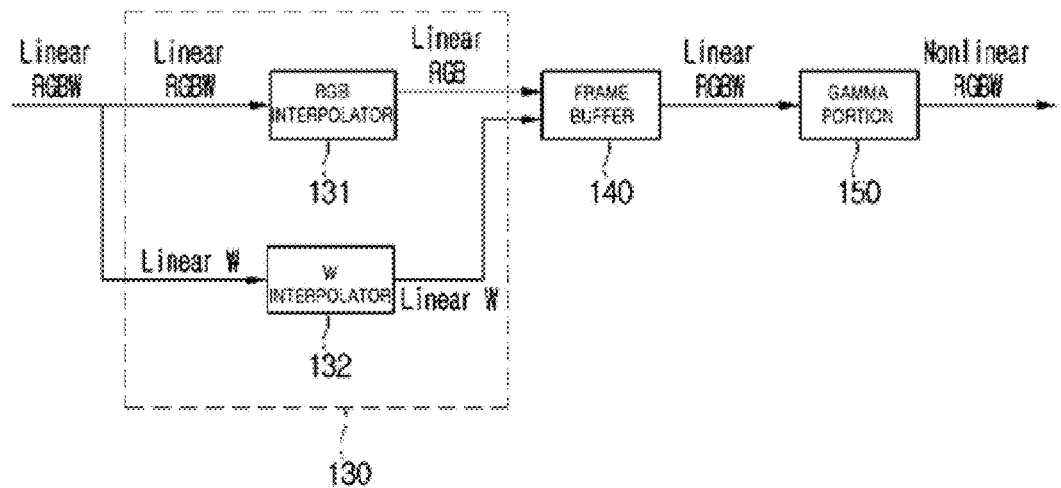
FIG. 2 is a detailed block diagram showing the image scale device according to an embodiment of the present disclosure.
Figure 3:
FIG. 3 is a schematic diagram illustrating an example operation principle of the image up-scale device.

FIG. 2 is a detailed block diagram showing an example of the up-scale device 130 in FIG. 1. FIG. 3 is a schematic diagram illustrating an operation principle of the up-scale device 130 in FIG. 2.

In this disclosure, 'j,k' will be referred to as a coordinate value. The 'j' is an arbitrary abscissa value (e.g., x-coordinate), and the 'k' is an arbitrary ordinate value (e.g., y-coordinate). A (j,k)th pixel is positioned at a coordinate value of (j,k) on an input image formalized into a two-dimensional space. A (j+1,k)th pixel is positioned adjacently to the (j,k)th pixel in a horizontal direction, a (j,k+1)th pixel is positioned adjacently to the (j,k)th pixel in a vertical direction, and a (j+1,k+1)th pixel is positioned adjacently to the (j,k)th pixel in a diagonal direction. The (j,k)th, (j+1,k)th, (j,k+1)th and (j+1,k+1)th pixels adjacent to one another are arranged in a rectangular shape on the input image.

An up-scaled image may include pixels of an input image (or an original image) and additional pixels which are added by the up-scale device 130. The additional pixels included in the up-scaled image may be arranged in such a manner to separate the pixels of the input image from one another, or divide the pixels of the input image into a plurality of pixel groups. The pixel groups may include 2*2 pixels, 3*3 pixels, 4*4 pixels, or others.

As such, at least one (or a part) of the additional pixels may each be positioned between two pixels of the input image which were adjacent to each other in a horizontal direction. At least one other additional pixel (or another part) of the additional pixels may each be positioned between two pixels of the input image which were adjacent to each other in a vertical direction. At least one still other additional pixel (or yet another part) of the additional pixels may each be positioned between four pixels of the input image which are adjacent to one another in horizontal and vertical directions.

With reference to FIG. 2, the up-scale device 130 according to an embodiment of the present disclosure may selectively perform different interpolations for the RGBW data signals RGBW on the basis of two characteristics. One of the two characteristics corresponds to a human color perception characteristic, wherein human eyes are less sensitive to a different color component than to a brightness component. The other characteristic is that the W data signal among the RGBW data signal reflects the brightness component, and the RGB data signals reflect the color difference component. In other words, the up-scale device 130 may perform the different interpolations for the RGBW data signals in consideration of the human color perception characteristic. Such an up-scale device 130 may include a RGB interpolator 131 and a W interpolator 132.

The RGB interpolator 131 may generate R, G, and B data signals of each additional pixel based on the R, G, and B data signals of the most antecedent pixel (e.g., closest preceding pixel) among the pixels of the input image which will be adjacent to the respective additional pixel. The W interpolator 132 may generate a W data signal of each additional pixel on the basis of the W data signals of at least two pixels of the input image which will be adjacent to the respective additional pixel. For example, in the case where an additional pixel positioned between (j,k)th and (j+1,k)th pixels on the input image is generated, the RGB interpolator 131 may derive the R, G, and B data signals of an additional pixel from the R, G, and B data signals of the (j,k)th pixel on the input image which will be adjacent to the additional pixel. The W interpolator 132 may generate the W data signal of the additional pixel using the W data signals of the (j,k)th pixel and the (j+1,k)th pixel on the input image which will be adjacent to the additional pixel. The R, G, and B data signals of the additional pixel may be the same as those of the (j,k)th pixel on the input image which will be adjacent to the additional pixel. The W data signal of the additional pixel may be obtained by averaging the W data signals of the (j,k)th pixel and at least one adjacent pixel thereto (e.g., the (j+1, k)th pixel) on the input image which will be adjacent to the additional pixel. In this manner, the R, G, and B data signals for each of the additional pixels may be obtained by referring to the R, G, and B data signals of one pixel of the input image which will be adjacent to the respective additional pixel. The W data signal for each of the additional pixels may be defined as an average value between at least two pixels on the input image which will be adjacent to the respective additional pixel. As such, inaccuracy due to the interpolation may be significantly lowered.

The RGB and W interpolators 131 and 132 included in the up-scale device 130 will now be described in more detail with reference to FIGS. 2 and 3.

The RGB interpolator 131 may derive the R, G, and B data signals of each additional pixel from those of the most antecedent pixel among the pixels of the input image which will be adjacent to the respective additional pixel. The additional pixel may be positioned (or inserted) either between two pixels on the input image, which are adjacent to each other in a horizontal direction or a vertical direction, or between four pixels on the input image, which are adjacent to one another in horizontal and vertical directions. For example, the additional pixel may be positioned (or inserted) between (j,k)th and (j+1,k)th pixels on the input image, between (j,k)th and (j,k+1)th pixels on the input image, or between (j,k)th, (j+1,k)th, (j,k+1)th and (j+1,k+1)th pixels on the input image. In this case, the RGB interpolator 131 may derive the R, G, and B data signals $I'_{red}$, $I'_{green}$ and $I'_{blue}$ of an additional pixel I' from the $I_{(j,k),red}$, $I_{(j,k),green}$ and $I_{(j,k),blue}$ of the (j,k)th pixel $I_{(j,k)}$ on the input image, as represented by Equation 3.

$$I'_{red}=I_{(j,k),red}$$

$$I'_{green}=I_{(j,k),green}$$

$$I'_{blue}=I_{(j,k),blue} \quad \text{[Equation 3]}$$

As represented by Equation 3, the R, G, and B data signals for each of the additional pixels may be referred to the same values as those of an arbitrary pixel of the input image which will be adjacent to the respective additional pixel. This results from the fact that the R, G, and B data signals may correspond to a color difference component which has low sensitivity in human color perception. For example, the R, G, and B data signals $I'_{red}$, $I'_{green}$ and $I'_{blue}$ of an additional pixel I' may be obtained by originally referring to values of those $I_{(j,k),red}$, $I_{(j,k),green}$ and $I_{(j,k),blue}$ of a (j,k)th pixel $I_{(j,k)}$ on the input image which will be adjacent to the respective additional pixel.

The W interpolator 132 may derive a W data signal of each additional pixel from the W data signals of at least two pixels on the input image which will be adjacent to the respective additional pixel. For example, the additional pixel may be positioned (or inserted) between (j,k)th and (j+1,k)th pixels on the input image, between (j,k)th and (j,k+1)th pixels on the input image, or between (j,k)th, (j+1,k)th, (j,k+1)th, and (j+1,k+1)th pixels on the input image. In this case, the RGB interpolator 131 may derive the W data signals $I'_{white}$ of an additional pixel from at least two among the W data signals $I_{(j,k),white}$, $I_{(j+1,k),white}$, $I_{(j,k+1),white}$ and $I_{(j+1,k+1),white}$ of the (j,k)th, (j+1,k)th, (j,k+1)th and (j+1,k+1)th pixels on the input image, as represented by Equation 4.

$$I'_{white} = \frac{I_{(j,k),white} + I_{(j,k+1),white}}{2}, \quad \text{[Equation 4]}$$

$$I'_{white} = \frac{I_{(j+1,k),white} + I_{(j,k),white}}{2}, \text{ or}$$

$$I'_{white} = \frac{I_{(j,k),white} + I_{(j+1,k),white} + I_{(j,k+1),white} + I_{(j+1,k+1),white}}{4}$$

As represented by Equation 4, a W data signal of an additional pixel may be defined as an average value between the W data signals of two pixels on the input image which will be adjacent to the additional pixel in an interpolated image. The W data signal may correspond to a brightness component having high sensitivity in human color perception. As such, the W data signal of the additional pixel may be obtained from the W data signals of at least two pixels on the input image which will be adjacent to the additional pixel in the interpolated image, by performing a linear interpolation process. In this way, the W data signal of the additional pixel may be obtained, for example, using an average value interpolation method, which is a simple interpolation method. However, present embodiments are not limited thereto. A variety of interpolation methods may be selectively used to generate the W data signal of the additional pixel, in consideration of the tolerance of a system for computational complexity.

Figure 4:
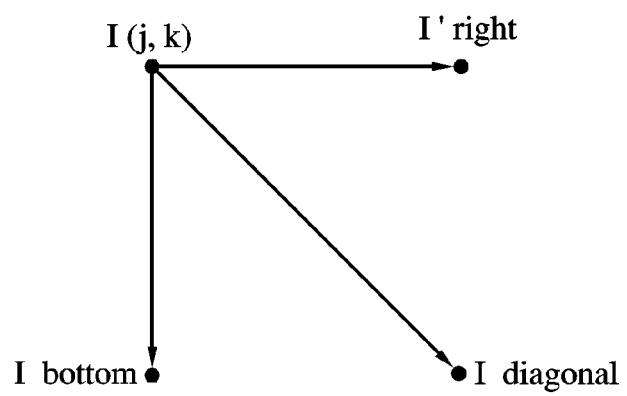
FIG. 4 is a schematic diagram illustrating an example of an operation procedure of the image scale device according to an embodiment of the present disclosure.

FIG. 4 is a schematic diagram illustrating an example of an operation procedure of the image scale device according to an embodiment of the present disclosure. FIG. 4 shows a diagram of a part of an up-scaled image which may be displayed on a display panel with, for example, a high definition of 3840*2160. The up-scaled image may be derived from an input image for another display panel with a lower definition of, e.g., 1920*1080, 2560*1440, 2880*1620, 3072*1728, or others. The up-scaled image includes a plurality of additional pixels as well as the pixels on the input image.

The additional pixels may be arranged in such a manner to separate the pixels on the input image from one another, or to divide the pixels on the input image into a plurality of pixel groups. Also, the additional pixels may be distinguished into additional right pixels $I'_{right}$, additional bottom pixels $I'_{bottom}$ and additional diagonal pixels $I'_{diagonal}$ according to their positions.

The additional right pixel $I'_{right}$ may correspond to an additional pixel positioned at the right side of the most antecedent pixel among the pixels of the input image which are adjacent to the additional pixel. The additional bottom pixel $I'_{bottom}$ may be an additional pixel positioned at the bottom side of the most antecedent pixel among the pixels of the input image which are adjacent to the additional pixel. The additional diagonal pixel $I'_{diagonal}$ may become an additional pixel positioned at the right-bottom side of the most antecedent pixel among the pixels of the input image which are adjacent to the additional pixel.

For convenience of explanation, it is assumed that a (j,k)th pixel $I_{(j,k)}$ on the input image corresponds to the most antecedent pixel among the pixels of the input image which are adjacent to the additional right, bottom and diagonal pixels $I'_{right}$, $I'_{bottom}$ and $I'_{diagonal}$. As shown in FIG. 4, the additional right pixel $I'_{right}$ may be positioned adjacently to the (j,k)th pixel $I_{(j,k)}$ of the input image in a right direction. The additional bottom pixel $I'_{bottom}$ may be positioned adjacently to the (j,k)th pixel $I_{(j,k)}$ of the input image in a bottom direction. The additional diagonal pixel $I'_{diagonal}$ may be positioned adjacently to the (j,k)th pixel $I_{(j,k)}$ of the input image in a diagonal direction running from upper left to lower right.

As such, the RGB interpolator 131 may generate color data components of the additional right, bottom and diagonal pixels $I'_{right}$, $I'_{bottom}$ and $I'_{diagonal}$ on the basis of the color data component of the (j,k)th pixel $I_{(j,k)}$ of the input image, as represented by the following Equation 5. The color data component for each of the additional right, bottom, and diagonal pixels $I'_{right}$, $I'_{bottom}$ and $I'_{diagonal}$ includes the R, G, and B data signals $I'_{red}$, $I'_{green}$ and $I'_{blue}$ which may be obtained using the above-mentioned Equation 3.

$$I'_{right} = I_{(j,k)}$$

$$I'_{bottom} = I_{(j,k)}$$

$$I'_{diagonal} = I_{(j,k)} \quad \text{[Equation 5]}$$

As represented by Equations 3 and 5, the R, G and B data signals $I'_{red}$, $I'_{green}$ and $I'_{blue}$ of the additional right, bottom and/or diagonal pixel $I'_{right}$, $I'_{bottom}$ and/or $I'_{diagonal}$ may have the same values as the R, G and B data signals $I_{(j,k),red}$, $I_{(j,k),green}$ and $I_{(j,k),blue}$ of the (j,k)th pixel $I_{(j,k)}$ of the input image. In accordance therewith, the RGB interpolator 131 may largely reduce the computational complexity of up-scaling an image.

Although not shown in the drawings, the additional right pixel $I'_{right}$ may also be positioned adjacently to a (j+1,k)th pixel $I_{(j+1,k)}$ of the input image. The additional bottom pixel $I'_{bottom}$ may also be positioned adjacently to a (j,k+1)th pixel $I_{(j,k)}$ of the input image. The additional diagonal pixel $I'_{diagonal}$ may also be positioned adjacently to (j+1,k)th, (j,k+1), and (j+1,k+1) pixels $I_{(j+1,k)}$, $I_{(j,k+1)}$ and $I_{(j+1,k+1)}$ of the input image. In other words, the additional right pixel $I'_{right}$ may be positioned between the (j,k)th and (j+1,k)th pixels $I_{(j,k)}$ and $I_{(j+1,k)}$ of the input image. The additional bottom pixel $I'_{bottom}$ may be positioned between the (j,k)th and (j,k+1)th pixels $I_{(j,k)}$ and $I_{(j,k+1)}$ of the input image. The additional diagonal pixel $I'_{diagonal}$ may be positioned between the (j,k)th, (j+1,k)th, (j,k+1) and (j+1,k+1) pixels $I_{(j,k)}$, $I_{(j+1,k)}$, $I_{(j,k+1)}$ and $I_{(j+1,k+1)}$ of the input image.

As such, the W interpolator 132 may derive a W data signal $I'_{right,white}$ of the additional right pixel $I'_{right}$ from the W data signals $I_{(j,k),white}$ and $I_{(j+1,k),white}$ of the (j,k)th and (j+1,k)th pixels $I_{(j,k)}$ and $I_{(j+1,k)}$ of the input image using the following Equation 6. Also, the W interpolator 132 may obtain a W data signal $I'_{bottom,white}$ of the additional bottom pixel $I'_{bottom}$ from the W data signals $I_{(j,k),white}$ and $I_{(j,k+1),white}$ of the (j,k)th and (j,k+1)th pixels $I_{(j,k)}$ and $I_{(j,k+1)}$ of the input image using the following Equation 7. Moreover, the W interpolator 132 may derive a W data signal $I'_{diagonal,white}$ of the additional diagonal pixel $I'_{diagonal}$ from the W data signals $I_{(j,k),white}$, $I_{(j+1,k),white}$, $I_{(j,k+1),white}$ and $I_{(j+1,k+1),white}$ of the (j,k)th, (j+1)th, (j,k+1)th and (j+1,k+1)th pixels $I_{(j,k)}$, $I_{(j+1,k)}$, $I_{(j,k+1)}$ and $I_{(j+1,k+1)}$ of the input image using the following Equation 8.

$$I'_{right,white} = \frac{I_{(j,k),white} + I_{(j+1,k),white}}{2} \quad \text{[Equation 6]}$$

$$I'_{bottom,white} = \frac{I_{(j,k),white} + I_{(j,k+1),white}}{2} \quad \text{[Equation 7]}$$

$$I'_{diagonal,white} = \frac{I_{(j,k),white} + I_{(j+1,k),white} + I_{(j,k+1),white} + I_{(j+1,k+1),white}}{4} \quad \text{[Equation 8]}$$

With reference to Equations 6 through 8, the W data signal $I'_{right,white}$ of the additional right pixel $I'_{right}$ corresponds to an average value of the W data signals $I_{(j,k),white}$ and $I_{(j+1,k),white}$ of the (j,k)th and (j+1,k)th pixels $I_{(j,k)}$ and $I_{(j+1,k)}$ of the input image, the W data signal $I'_{bottom,white}$ of the additional bottom pixel $I'_{bottom}$ is defined as an average value of the W data signals $I_{(j,k),white}$ and $I_{(j,k+1),white}$ of the (j,k)th and (j,k+1)th pixels $I_{(j,k)}$ and $I_{(j,k+1)}$ of the input image, and the W data signal $I'_{diagonal,white}$ of the additional diagonal pixel $I'_{diagonal}$ becomes an average value of the W data signals $I_{(j,k),white}$, $I_{(j+1,k),white}$, $I_{(j,k+1),white}$ and $I_{(j+1,k+1),white}$ of the (j,k)th, (j+1)th, (j,k+1)th and (j+1,k+1)th pixels $I_{(j,k)}$, $I_{(j+1,k)}$, $I_{(j,k+1)}$ and $I_{(j+1,k+1)}$ of the input image. Therefore, the W interpolator 131 may largely reduce the computational complexity of up-scaling an image.

Figure 5:
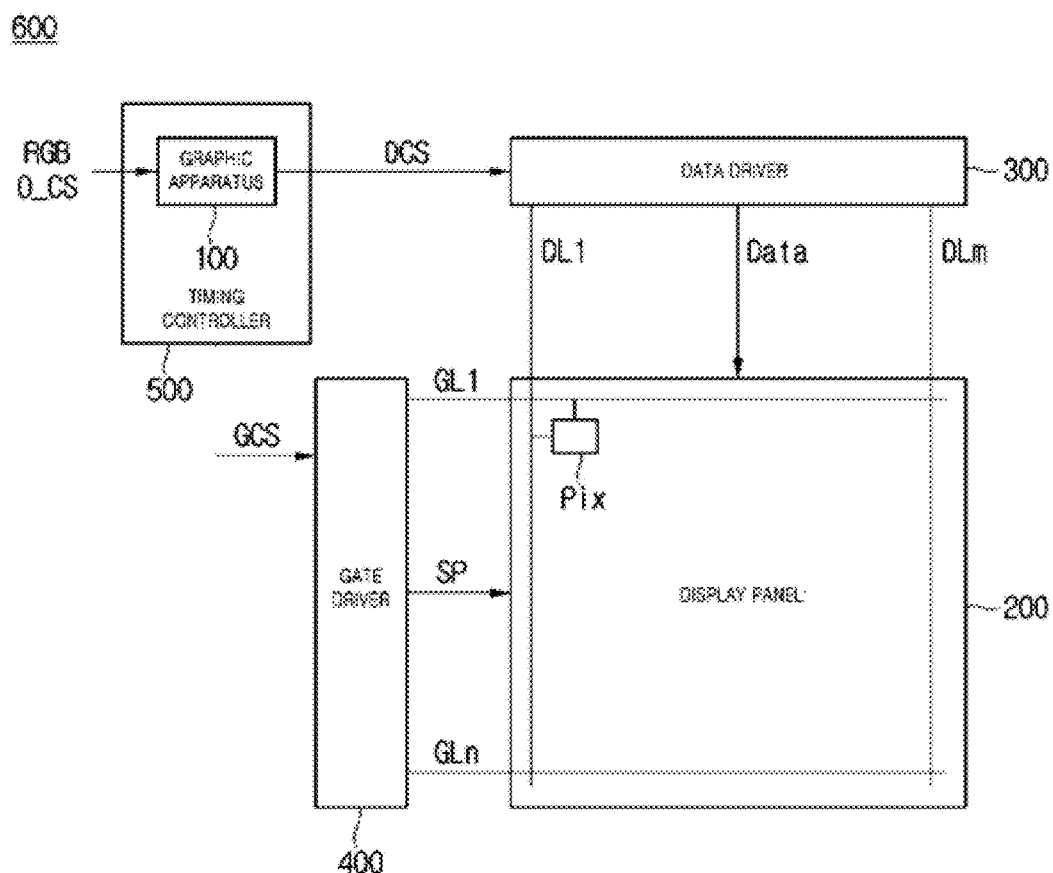
FIG. 5 is a block diagram showing a display device according to an embodiment of the present disclosure.
Figure 6:
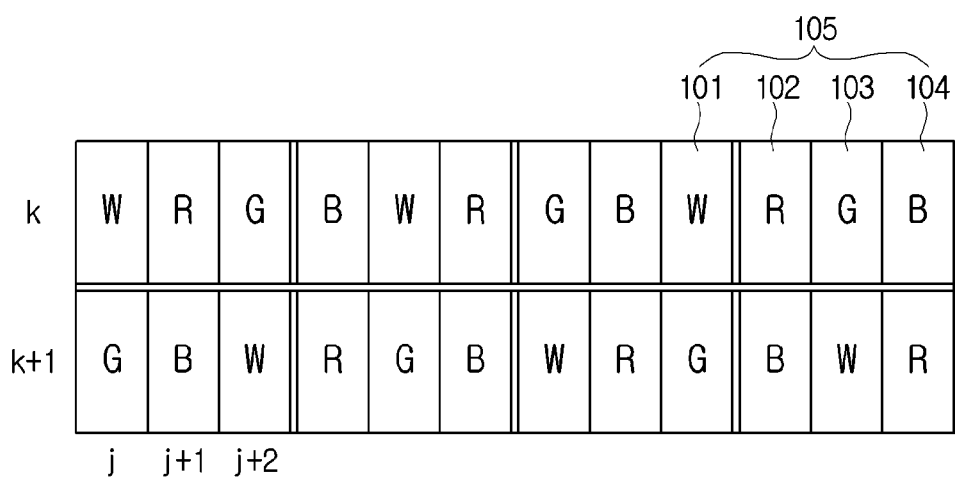
FIG. 6 is a planar view showing an arrangement of sub-pixels on the display panel in FIG. 5.

FIG. 5 is a block diagram showing a display device with a data conversion unit according to an embodiment of the present disclosure. FIG. 6 is a planar view showing an arrangement of sub-pixels.

With reference to FIG. 5, the display device 600 according to an embodiment of the present disclosure may include a display panel 200, a data driver 300, a gate driver 400, and a timing controller 500. The timing controller 500 may include a graphic apparatus 100. Alternatively, the graphic apparatus 100 may be included in the display device to be separate from the timing controller 500.

The display panel 200 may include a plurality of gate lines GL1~GLn and a plurality of data lines DL1~DLm. Also, the display panel 200 may include sub-pixels Pix formed in respective regions which are defined by the pluralities of gate lines GL1~GLn and data lines DL1~DLm.

The gate driver 400 may reply to gate control signals GCS applied from the timing controller 500, and supply a plurality of scan signals SP to the plurality of gate lines GL1~GLn, respectively. The plurality of scan signals SP may sequentially enable the plurality of gate lines GL1~GLn in one horizontal synchronous signal interval. Such a gate driver 400 may be configured with a plurality of gate IC (integrated circuit) chips.

The data driver 300 may reply to data control signals DCS applied from the timing controller 500 and generate data voltages whenever any one of the plurality of gate lines GL1~GLn is enabled. The data voltages generated in the data driver 300 may be applied to the plurality of data lines DL1~DLm on the display panel 200.

The timing controller 500 may generate the gate control signals GCS and the data control signals DCS using various control signals which may be applied from an external system (not shown), such as a graphic module of a computer system, or an image demodulation module of a television receiver. The gate control signals GCS may be used to control the gate driver 400, and the data control signals DCS may be used to control the data driver 300.

The sub-pixels Pix on the display panel 200 may be used to display R, G, B, and W colors. The color sub-pixels may be arranged as shown by example in FIG. 6. In detail, the color sub-pixels may be repeatedly arranged on an odd-numbered horizontal line k in order of a W sub-pixel 101, an R sub-pixel 102, a G sub-pixel 103, and a B sub-pixel 104. Also, the color sub-pixels may be repeatedly arranged on an even-numbered horizontal line k+1 in order of a G sub-pixel 103, a B sub-pixel 104, a W sub-pixel 101, and an R sub-pixel 102. As such, the color sub-pixels on the odd-numbered horizontal line k and the respective (or same) color sub-pixels on the even-numbered horizontal line k+1 may be arranged along a vertical direction in a zigzag pattern rather than a line (or row). For example, two W sub-pixels 101 may be positioned at an intersection of a jth vertical line and the odd-numbered horizontal line k and another intersection of a (j+1)th vertical line and the even-numbered horizontal line k+1. In other words, one of two same color sub-pixels (e.g., two R, G, B, or W sub-pixels), which are adjacently positioned in an odd-numbered horizontal line k and an adjacent even-numbered horizontal line k+1, is disposed on an arbitrary vertical line (for example, a jth vertical line), and the other one is disposed on a different vertical line (for example, (j−2 or j+2)th vertical line) which is shifted from the arbitrary vertical line by two sub-pixels in a lateral direction. Such a zigzaged sub-pixel arrangement, which may allow same color sub-pixels on the odd-numbered line k and the even-numbered horizontal line k+1 to be shifted from each other by the distance (or length) of two sub-pixels, may prevent the appearance of straight lines (unless a linear sub-pixel arrangement allows same color sub-pixels to be arranged in a vertical direction).

For example, a liquid crystal display (LCD) device may be used as the display panel 200. In this case, the sub-pixel Pix includes a thin film transistor TFT connected to one of the gate lines GL1~GLn and one of the data lines DL1~DLm, and a pixel electrode connected to the thin film transistor. The thin film transistor TFT may transfer a data voltage on one of the data lines DL1~DLm to a liquid crystal cell (or the pixel electrode) in response to a scan signal SP from one of the gate lines GL1~GLn. To this end, the thin film transistor TFT may include a gate electrode connected to one of the gate lines GL1~GLn, a source electrode connected to one of the data lines DL1~DLm, and a drain electrode connected to the pixel electrode of the liquid crystal cell. Also, a storage capacitor for maintaining the voltage of the liquid crystal cell may be formed on a lower glass substrate of the display panel 200. Moreover, color filters and a black matrix may be formed on an upper glass substrate of the display panel 200. The color filter may be formed opposite to a pixel region in which the thin film transistor TFT is formed. The black matrix may rim the color filters and shield the gate lines GL1~GLN, the data lines DL1~DLm, the thin film transistor, and so on. Such color filters may allow the sub-pixels to be distinguished in R, G, B, and W sub-pixels. As such, the liquid crystal cells included in the R, G, B, and W sub-pixels may be used to display R, G, B, and W colors, respectively.

As another example of the display panel 200, an organic light emitting diode display panel may be used. In this case, the R, G, B, and W sub-pixels may each include an organic light emitting diode. Such R, G, B, and W sub-pixels may output respective color lights by emitting the respective organic light emitting diodes. As such, the organic light emitting diode display panel may display an image. The organic light emitting diode may be formed in either a structure including a hole transport layer, an organic emission layer, and an electron transport layer, or another structure including a hole injection layer, a hole transport layer, an organic emission layer, an electron transport layer, and an electron injection layer. Moreover, a functional layer for enhancing light emission efficiency and life span of the organic emission layer may be additionally included in the organic light emitting diode.

As described above, the graphic apparatus with the image up-scale device 130 according to an embodiment of the present disclosure may up-scale an input image by dividing RGBW data signals RGBW into RGB data signals RGB and a W data signal W, and generating RGB data signals and a W data signal of an additional pixel using the divided RGB data signals and the divided W data signal. In other words, the RGBW data signals are divided into a color difference component and a brightness component, and interpolation is differently performed for the color difference component and the brightness component. As such, the interpolation with a small computational quantity may be performed for any one of the divided components which has a low sensitivity in human color perception. Therefore, the computational quantity may be reduced.

For example, the RGB data signals of the additional pixel may be generated originally using the RGB data signals of an adjacent pixel of the input image which is nearest adjacent to the additional pixel. The W data signal of the additional pixel may be generated by averaging the W data signals of pixels of the input image which are nearest adjacent to the additional pixel. In other words, the color difference component of the additional pixel having low sensitivity in human color perception is generated originally using that of a pixel on the input image which is nearest adjacent to the additional pixel. As such, the computational quantity for the image up-scale may be largely reduced. Also, the number of line memories and the size of a logic circuit may be reduced. Therefore, not only the image up-scale device, but also the graphic apparatus, may be largely reduced in manufacturing cost.

Figure 7:
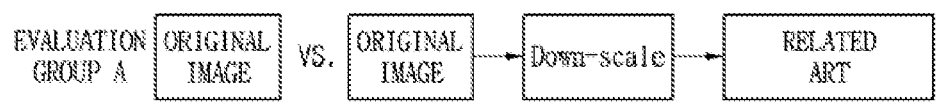
FIG. 7 is data showing a quantitative comparison for evaluating performances of image up-scale devices according to embodiments of the present disclosure and related art.
Figure 7:
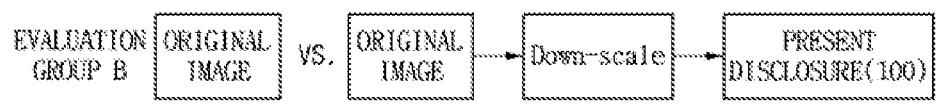

FIG. 7 is a data sheet that quantitatively compares and evaluates performances of image up-scale devices according to embodiments of the present disclosure and related art by using signal-to-noise ratios (SNRs). In FIG. 7, "evaluation group A" includes measured SNRs of up-scaled images, which are performed by an image up-scale device of the related art for down-scaled images derived from original images, with respect to the original images. Meanwhile, "evaluation group B" includes measured SNRs of up-scaled images which are performed by the image up-scale device of the present disclosure for the down-scaled images derived from the original images, with respect to the original images. The image up-scale device of the related art may employ one of bi-linear interpolation, bi-cubic interpolation, cubic spline interpolation, Lanczos interpolation, and edge directed interpolation EDI. As seen from the evaluation groups A and B in FIG. 7, it is evident that the image up-scale device of embodiments of the present disclosure is similar to that of the related art in signal-to-noise ratio. In other words, the image up-scale device of embodiments of the present disclosure, which differently interpolates the color difference component and the brightness component, may provide almost or about equivalent performance to that of the related art, which has high computational complexity. As such, the image up-scale device of embodiments of the present disclosure may up-scale the image while maintaining proper image quality. Therefore, the image up-scale device of embodiments of the present disclosure may reduce the computational quantity and the logic circuit size.

It will be apparent to those skilled in the art that various modifications and variations may be made in the display device of the present invention without departing from the spirit or scope of the invention. Thus, it is intended that the present invention cover the modifications and variations of this invention provided they come within the scope of the appended claims and their equivalents.

What is claimed is:

1. An image scale device for up-scaling an input image by generating data signals for a plurality of additional pixels, the additional pixels added to the input image to generate an upscaled image, the device comprising:
a processor configured to receive red (R), green (G), and blue (B) data signals included in the input image for each arbitrary pixel that is adjacent to the respective additional pixel and to generate red (R), green (G), and blue (B) data signals for each of the additional pixels; and
the processor configured to receive a white (W) data signal included in the input image for each arbitrary pixel that is adjacent to the respective additional pixel and to generate a white (W) data signal for each of the additional pixels based on the W data signals of each of the arbitrary pixels that is adjacent to the respective additional pixel,
wherein only the R, G, and B values of only one arbitrary pixel that is adjacent to the respective additional pixel are respectively used by the processor to generate the R, G, and B data signals of the respective additional pixel such that the R, G, and B data signals of the respective additional pixel have the same values as those of only the one arbitrary pixel among the pixels of the input image that are adjacent to the respective additional pixel,
wherein the W data signals generated in the processor are obtained by averaging the W data signals of the pixels of the input image that are adjacent to the respective additional pixels, and
wherein the processor adds the generated R, G, B, and W data signals for each of the additional pixels to the input image to generate the upscaled image, and outputs the upscaled image for display.

2. The device of claim 1, wherein the R, G, and B data signals for each of the additional pixels have the same values as those of the nearest preceding pixel among the pixels of the input image that are adjacent to the respective additional pixel.

3. The device of claim 1, wherein the additional pixels include:
an additional pixel I positioned between two pixels of the input image that are adjacent to each other in a horizontal direction;
an additional pixel II positioned between two pixels of the input image that are adjacent to each other in a vertical direction; and
an additional pixel III positioned between four pixels of the input image that are adjacent to one another in the horizontal and vertical directions.

4. The device of claim 3, wherein the W data signal of the additional pixel I is obtained by averaging the W data signals of the two pixels of the input image that are adjacent to the additional pixel I in the horizontal direction.

5. The device of claim 3, wherein the W data signal of the additional pixel II is obtained by averaging the W data signals of the two pixels of the input image that are adjacent to the additional pixel II in the vertical direction.

6. The device of claim 3, wherein the W data signal of the additional pixel III is obtained by averaging the W data signals of the four pixels of the input image that are adjacent to the additional pixel III in diagonal directions.

7. A method of up-scaling an input image by adding a plurality of additional pixels to generate an up-scaled image, the method comprising:
generating a color difference component corresponding to red (R), green (G), and blue (B) data signals for each of the additional pixels on the basis of the color difference component of an arbitrary pixel among pixels of the input image that are adjacent to the respective additional pixel;
generating a brightness component corresponding to a white (W) data signal for each of the additional pixels on the basis of the brightness component of the pixels of the input image that are adjacent to the respective additional pixel, wherein only the color difference component of only one arbitrary pixel that is adjacent to the respective additional pixel is used to generate the color difference component of the respective additional pixel such that the color difference component for each of the additional pixels has the same value as that of only the respective one arbitrary pixel among the pixels of the input image that are adjacent to the respective additional pixel, wherein the brightness component for each of the additional pixels is obtained by averaging the brightness components of the pixels of the input image that are adjacent to the respective additional pixels; and outputting the upscaled image for display.

8. The method of claim 7, wherein the color difference component for each of the additional pixels has the same value as that of the nearest preceding pixel among the pixels of the input image that are adjacent to the respective additional pixel.

9. The method of claim 7, wherein the additional pixels include:

an additional pixel I positioned between two pixels of the input image that are adjacent to each other in a horizontal direction;

an additional pixel II positioned between two pixels of the input image that are adjacent to each other in a vertical direction; and additional pixel III positioned between four pixels of the input image that are adjacent to one another in the horizontal and vertical directions.

10. The method of claim 9, wherein the brightness component of the additional pixel I is obtained by averaging the brightness components of the two pixels of the input image that are adjacent to the additional pixel I in the horizontal direction.

11. The method of claim 9, wherein the brightness component of the additional pixel II is obtained by averaging the brightness components of the two pixels of the input image that are adjacent to the additional pixel II in the vertical direction.

12. The method of claim 9, wherein the brightness component of the additional pixel III is obtained by averaging the brightness components of the four pixels of the input image that are adjacent to the additional pixel III in diagonal directions.

* * * * *